United States Patent [19]

Emmert

[11] 4,007,757
[45] Feb. 15, 1977

[54] VALVE SHIFTING MECHANISM

[75] Inventor: Robert Wayne Emmert, Cedar Falls, Iowa

[73] Assignee: Deere & Company, Moline, Ill.

[22] Filed: Oct. 16, 1975

[21] Appl. No.: 623,086

[52] U.S. Cl. .................. 137/315; 74/55; 137/609; 137/636.1; 251/257; 251/297
[51] Int. Cl.² ........................... F16K 31/524
[58] Field of Search ............ 137/595, 609, 624.18, 137/636, 636.1, 315; 251/251, 257, 258, 262, 263; 74/55

[56] References Cited

UNITED STATES PATENTS

| 928,874 | 7/1909 | Morgan | 251/257 |
| 3,161,137 | 12/1964 | Thoma et al. | 251/263 X |
| 3,192,952 | 7/1965 | Botnick | 251/251 X |
| 3,894,719 | 7/1975 | Horvath | 137/636.1 X |

FOREIGN PATENTS OR APPLICATIONS

| 1,247,556 | 10/1960 | France | 137/636.1 |
| 3,055 | 6/1893 | United Kingdom | 137/609 |

Primary Examiner—Martin P. Schwadron
Assistant Examiner—Richard Gerard

[57] ABSTRACT

An easily assembled valve shifting mechanism includes a hexagonal shaft over which several different cam plates are slidably assembled in a predetermined manner. Each cam plate includes complementary cam surfaces for engaging and providing positive motion to a cam follower mounted on a valve spool. The cam surfaces of all the cam plates bear a predetermined relationship to each other to cause movement of the different valve spools in a predetermined sequence. One of the cam plates further includes detent means for defining each of the steps in the predetermined sequence.

3 Claims, 6 Drawing Figures

VALVE SHIFTING MECHANISM

BACKGROUND OF THE INVENTION

The present invention relates generally to a spool valve shifting mechanism and more particularly to an easily assembled, cam-operation, valve shifting mechanism.

In the past, cams were pinned or keyed into position on round shafts. This has the disadvantages of necessitating machining of pin holes or key ways into the shaft and cams, and the need for extra parts such as pins and keys. Further, the cams had to have matched pin holes or key ways in order to obtain a predetermined relationship between all the cams on a shaft. Still further, assembly was not facilitated since the pin holes or key ways in the cams and shafts had to be lined up in order to insert the pins or keys.

Also in the past, it was customary to put the detent mechanism external to rather than in the valve which required the mechanism to be large in size when detent forces were large.

SUMMARY OF THE INVENTION

The present invention provides an easily assembled valve spool shifting mechanism for a plurality of spools in a valve which must be shifted in a predetermined sequence. Further, means are provided for integral detenting of each of the sequential positions.

The above and additional advantages of the present invention will become apparent to those skilled in the art from a consideration of the following detailed description of the preferred embodiment when taken in conjunction with the accompanying drawing.

DESCRIPTION OF THE PREFERRED EMBODIMENT

Figure 1:
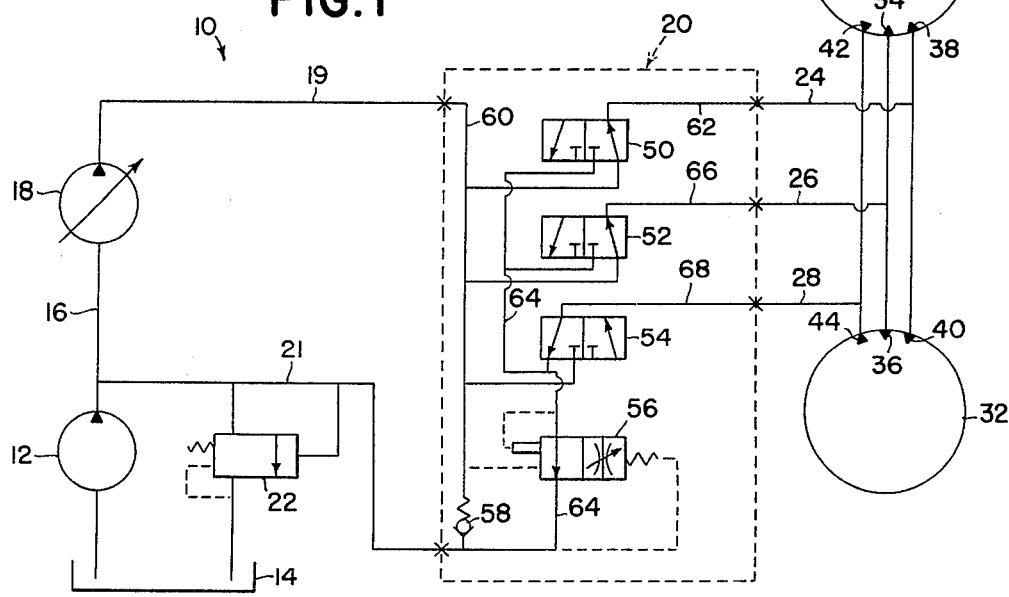
FIG. 1 is a schematic illustration of a hydrostatic transmission including a schematic representation of the valving with which the present invention is utilized.

Referring now to FIG. 1, therein is shown in hydrostatic transmission generally designated by the numeral 10. The transmission 10 includes a charge pump 12 connected to a reservoir 14 for supplying fluid through a charging circuit line 16 to a main pump 18. The main pump 18 supplies fluid through a line 19 to a drive control valve generally designated by the numeral 20 in which the present invention is utilized. Fluid from the valve 20 is exhausted through a line 21 which is connected to the charging circuit line 16 and also to a conventional overload relief valve 22 which dumps to the reservoir 14.

The drive control valve 20 is connected by a first, second, and third line 24, 26, and 28, to ports in a pair of stepped variable displacement hydraulic motors 30 and 32. The motors 30 and 32 are radial piston cam lobe motors with stepped variable displacement as disclosed and claimed in the U.S. Pat. No. 3,760,691 granted to Kleckner et al on Sept. 25, 1973. The motors 30 and 32 are provided with first ports 34 and 36, respectively, which when pressurized will cause the motors to have a first displacement in the forward direction, and with second ports 38 and 40 which when pressurized will cause the motors to have a second displacement in the forward direction, and third ports 42 and 44 which when pressurized will cause the motors to have a displacement which is the sum of the two displacements in the reverse direction. Further, when the first and second ports 34, 36, 38, and 40 are together pressurized the motors will have a displacement in the forward direction which is also the sum of the first and second displacements. The first line 24 is connected to the second ports 38 and 40; the second line 26 is connected to the first ports 34 and 36; and the third line 28 is connected to the third ports 42 and 44.

The drive control valve 20 when used with the stepped variable displacement motors 30 and 32 provides a neutral position wherein the motors are not driven, a first position where the motors are driven at a first speed, a second position where the motors are driven at a second speed, a third position where the motors are driven at a third speed, and a reverse position wherein the motors are driven at the first speed in the reverse direction as will later be explained.

The drive control valve 20 includes five component valves: three direction control valves 50, 52, and 54; a retarder valve 56; and a check valve 58. Of the valves 50 through 58, only valves 50, 52 and 54 are directly concerned with the present invention. The valve 56 is a conventional retarder valve and the valve 58 is a conventional check valve.

The direction control valve 50 is shiftable between a first position wherein it connects a line 19-connected fluid passage 60 to a line 24-connected fluid passage 62 and a second position wherein it connects a line 21-connected fluid passage 64 with the fluid passage 62. The direction control valve 52 is shiftable between a first position wherein it connects the fluid passage 60 to a line 26-connected fluid passage 66 and a second position wherein it connects the fluid passage 66 to the fluid passage 64. The direction control valve 54 is shiftable between a first position wherein it connects the fluid passage 60 to a line 28-connected fluid passage 68 and to a second position wherein it connects the fluid passage 68 to the fluid passage 64.

Figure 2:
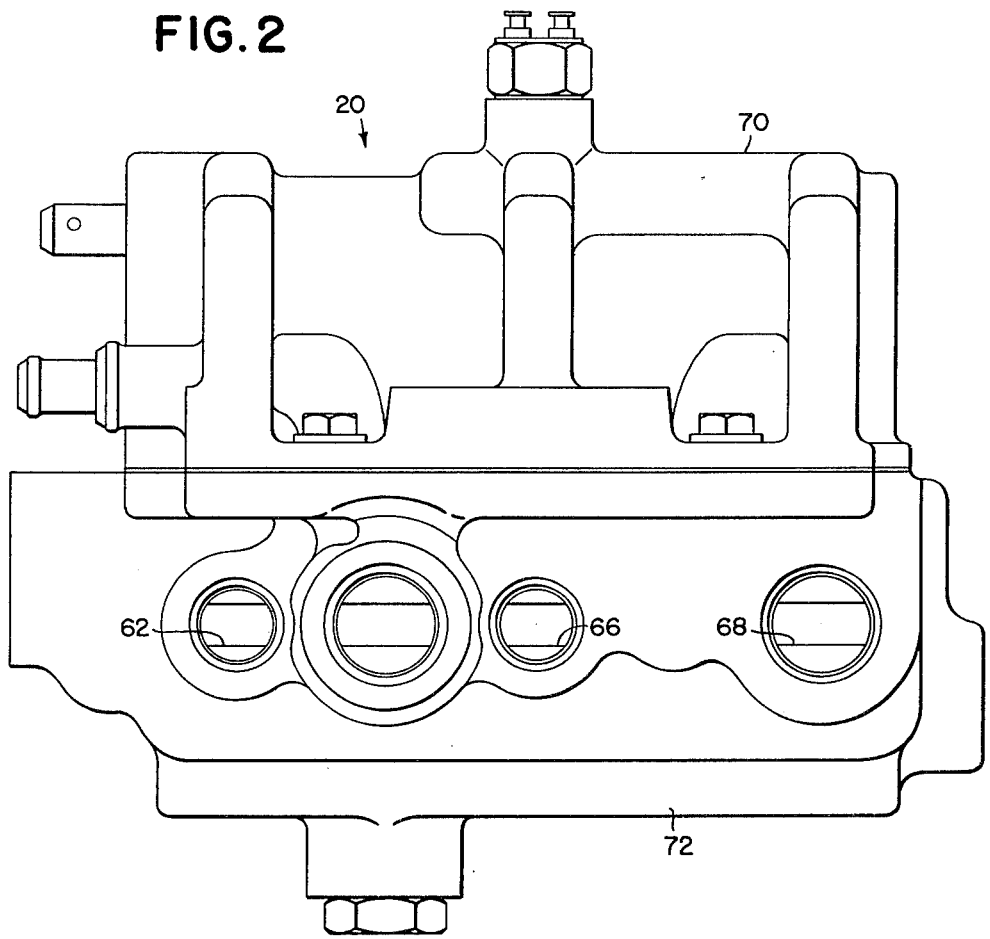
FIG. 2 is a side view of the valve incorporating the present invention.

Referring now to FIG. 2, therein is shown the drive control valve 20 which includes a shifting mechanism housing 70 and a valve body 72. In the valve body 72 are shown the fluid passages 62, 66, and 68.

Figure 3:
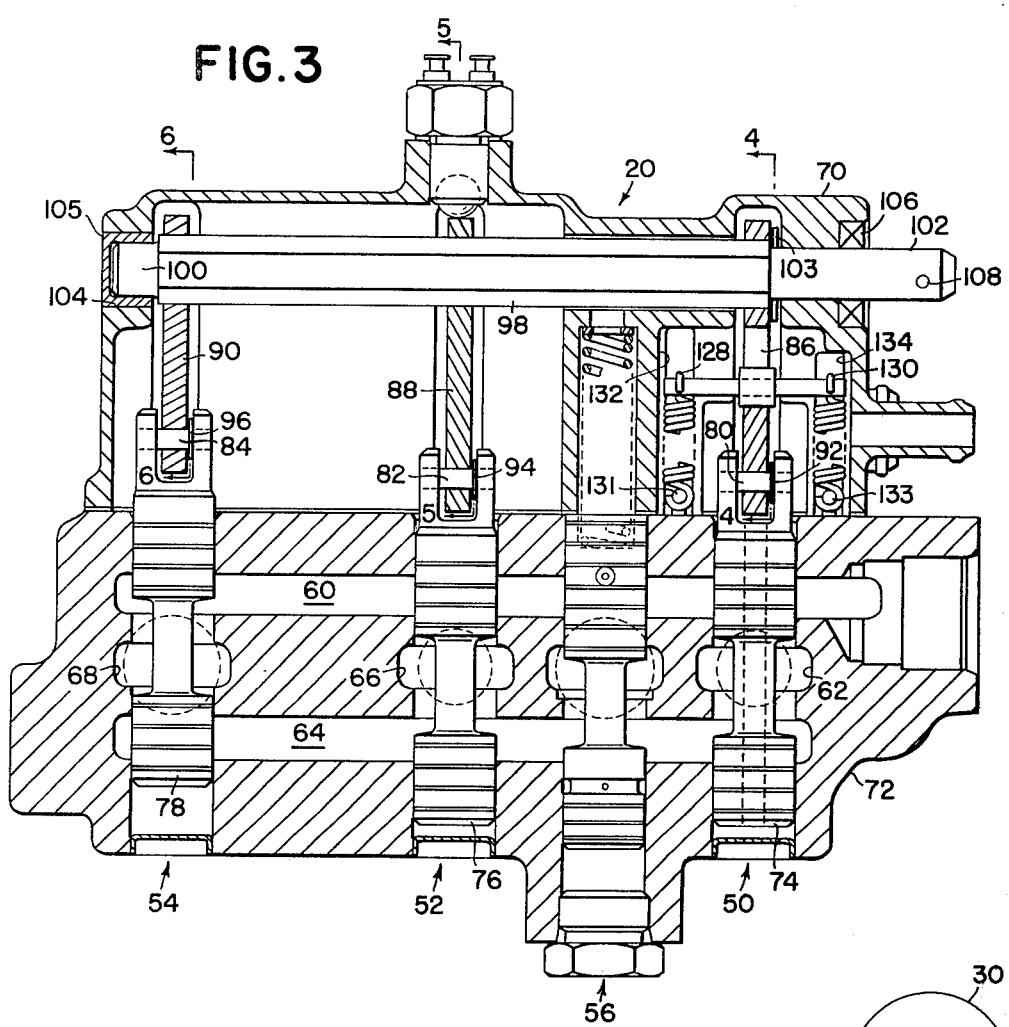
FIG. 3 is a sectional view of the valve and the present invention shown in FIG. 2 taken along its longitudinal center line.

Referring now to FIG. 3, the direction control valves 50, 52, and 54 are shown including valve spools 74, 76, 78, respectively. The valve spools 74, 76, and 78 are identical and have clevis portions at the upper ends carrying cam follower pins 80, 82, and 84, respectively. The cam follower pins 80, 82, and 84 are inserted through cam plates 86, 88, and 90, respectively. Between the cam plates 86, 88, and 90 and one side of the clevis portions of the valve spools 74, 76, and 78 are snap rings 92, 94, and 96 which serve to retain the cam follower pins 80, 82, and 84 in their respective valve spools.

The cam plates 86, 88, and 90 are slidably positioned on a hexagonal shaft 98 which has rounded ends 100 and 102 for insertion in a bushing 105 in a hole 104 in the valve housing 70 and a bearing 106 in the valve housing 70. On the rounded end 102 and abutting the hexagonal cross-section portion is a thrust washer 103. In the rounded end 102 is a cross-drilled hole 108 which is perpendicular to the longitudinal axis of the shaft 98 and which is oriented parallel to a pair of diametrically opposed corners of the hexagonal cross-section portion of the shaft 98.

Figure 4:
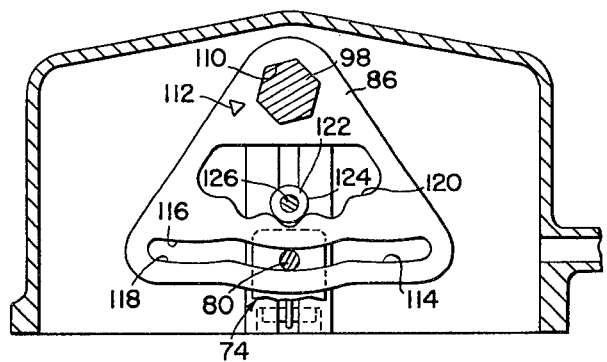
FIG. 4 is a sectional view of the spool shifting mechanism taken along line 4—4 of FIG. 3 shown in a different position from FIG. 3.

Referring now to FIG. 4, therein is shown the cam plate 86 having provided therein a hexagonal hole 110 for slidably receiving the hexagonal cross-section of the shaft 98. To orient the cam plate 86 relative to the hole 108 in the hexagonal shaft 98, there is provided indicia means or a triangular mark 112 oriented relative to a corner of the hexagonal hole 110. Near the outer periphery of the cam plate 86 is a cam surface 114 which has complementary upper and lower working cam profiles 116 and 118, respectively. The cam profiles 116 and 118 have predetermined displacements or curves towards and away from the center of the hole 110 so as to raise and lower the cam follower pin 80 and thus the valve spool 74 between its first and second positions upon the rotation of the shaft 98 when inserted in the hole 110. For example, with the cam plate 86, when the cam profiles 116 and 118 are divided into five equal 20° incremental steps for positioning of the cam follower pin 80, and the steps designated from left to right in FIG. 4 as reverse, neutral, first, second, and third, the valve spool 74 will move from the second position to the first position during a shift from reverse to neutral steps, in the first position between neutral and second, and move from the first position back to the second during a shift from second to third.

In addition to the cam surface 114, there is provided a detent cam surface 120 in the cam plate 86. The detent cam surface 120 has displacements or lobes towards and away from the center of the hole 110 in five positions to provide the five incremental step positions previously described. Engaging the detent cam surface 120 is a detent follower 122 which includes a roller 124 and an axis pin 126. By reference to FIG. 3, it may be seen that the axis pin 126 is biased away from the shaft 98 by springs 128 and 130 attached to pins 131 and 133, respectively. Further, it may be seen that the detent follower 122 is restrained to move towards and away from the shaft 98 by being held in slots 132 and 134 in the valve housing 70. The springs 128 and 130 are chosen so as to be able to rotate the cam plate 86 when the detent follower 122 is on the portions of the cam surface 120 which are closest to the shaft 98 so that an operator can feel a positive detent position for each of the incremental steps.

Figure 5:
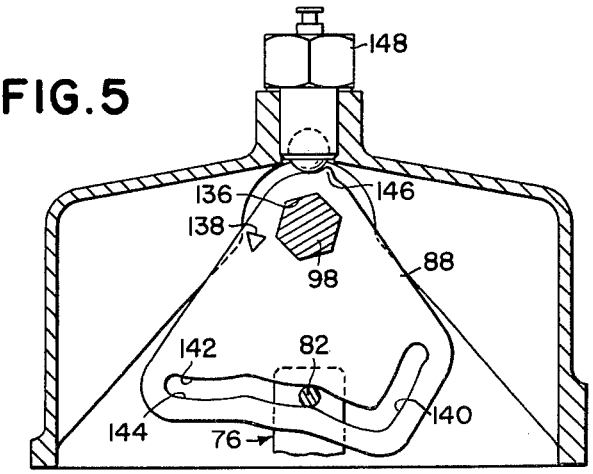
FIG. 5 is a sectional view of a further portion of the spool means shifting mechanism taken along the line 5—5 of FIG. 3 shown in a different position from FIG. 3.

Referring now to FIG. 5 therein is shown a cam plate 88 having a hexagonal hole 136 and adjacent indicia means or triangle 138. The cam plate 88 is provided with a cam surface 130 which includes complementary upper and lower working profiles 142 and 144. The displacements of the working profiles 142 and 144 are such as to provide positive action to move the valve spool 76 from the second position to its first position during a shift from reverse to neutral, hold it in the first position between neutral and first, move it from the first position to the second position during a shift from first to second, and move it to the first position during a shift from second to third. In addition the cam plate 88 has an external lobe 146 which closes a conventional neutral switch 148 to indicate when the cam plate 88 and thus the other cam plates 86 and 90 are in the neutral steps.

Figure 6:
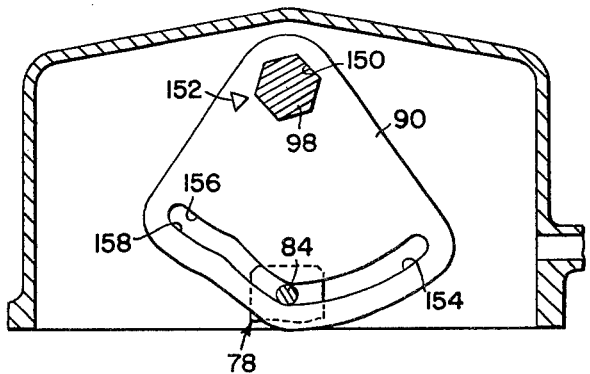
FIG. 6 is a sectional view of a further portion of the spool means shifting mechanism taken along line 6—6 of FIG. 3.

Referring now to FIG. 6 therein is shown the cam plate 90 having a hexagonal hole 150 and indicia means or triangle 152. Near the outer periphery of the cam plate 90 is a cam surface 154 having complementary upper and lower working profiles 156 and 158 which engage the cam follower pin 84. The positive action displacements of the working profiles 156 and 158, are such that they cause displacement of the cam follower pin 84 and thence of the valve spool 78 to the first position for the reverse and neutral steps and to the second position for the first, second and third steps.

Assembly of the drive control valve 20 is accomplished in a few simple steps. First, the cam follower pins 80, 82, and 84 are used to secure the valve spools 74, 76, and 78, respectively, to their respective cam plates 86, 88, and 90. Second, the cross-drilled hole 108 is oriented relative to the valve housing 70 and the shaft 98 is inserted into the opening 104. Third, the cam plate 90 is placed in the valve housing 70 with the triangle 152 in line with the hole 108 and the shaft 98 slid through the hexagonal hole 150. Fourth, the cam plate 88 is similarly positioned with the triangle 138 in line with the hole 108 and the shaft 98 is slid through the hexagonal hole 136. Fifth, the cam plate 86 with a detent follower 122 positioned therein is positioned in the valve housing 70 with the axis pin 126 inserted in the slots 132 and 134. The triangle 112 is lined up with the hole 108 and the shaft 98 slid through the hexagonal hole 110. The springs 128 and 130 are then stretched and the pins 131 and 133, respectively, are inserted. Sixth, the bushing 104 is press fit into place in the valve cover 70 to complete the valve cover assembly. Seventh, the valve cover with the valve spools is assembled with the valve body 72.

Having thus described the preferred embodiment of the invention, various modifications and improvements within the spirit and scope of the invention will become apparent to those skilled in the art and can be made without departing from the underlying principles of the invention. Therefore, the invention should not be limited to a specific illustration and description of a single preferred embodiment, but only by the appended claims.

I claim:

1. In a valve having a plurality of passages therein and first and second spool means therein selectively shiftable to connect and disconnect the passages, a spool means shifting mechanism comprising: a control shaft having a portion of hexagonal cross-section rotatably mounted in the valve proximate one end of the first and second spool means and having means therein for orienting the shaft relative to the valve; first cam means having a first hexagonal hole provided therein for non-rotatably and slidably mounting the first cam means on the shaft and further having indicia means therein for orienting the first hole relative to the orienting means in the shaft, the first cam means including first cam surface means therein positioned in a predetermined relationship to the first hole; the first cam surface having a first predetermined working profile with displacement towards and away from the first hole; second cam means having a second hexagonal hole provided therein for nonrotatably and slidably mounting the second cam means on the shaft and further having indicia means therein for orienting the second hole relative to the orienting means in the shaft; the second cam means including second cam surface means therein positioned in a predetermined relationship to the second hole; the second cam surface means having a second predetermined working profile with displacement towards and away from the second hole; first and second cam follower means connected respectively to the one ends of the first and second spool means and operatively associated with the first and second cam means, respectively, to limit sliding thereof on the shaft, said first and second cam follower means respectively following the first and second cam surface means when the first and second cam means are rotated by the control shaft whereby rotation of the shaft will shift the first and second spool means in a predetermined sequence.

2. The shifting mechanism as claimed in claim 1 wherein the first cam means includes detent cam surface means having a working profile with a plurality of displacements towards and away from the first hole which form a plurality of detent positions, and including detent follower means received within the detent cam surface means and constrained to move towards and away from the hole, and further including biasing means operatively connected to the detent follower means for rotating the shaft by urging the detent follower means into the detent positions.

3. The shifting mechanism as claimed in claim 1 wherein the first cam surface means includes a first complementary working profile complementary to the first working profile with displacement towards and away from the hole to provide positive motion of the first cam follower means and afford bi-directional travel of the first spool means and the second cam surface means includes a second complementary working profile complementary to the second working profile with displacement towards and away from the hole to provide positive motion of the second cam follower means and afford bi-directional travel of the second spool means.

* * * * *